Nov. 29, 1949     G. H. BROWN     2,489,560
ELECTRIC TEAKETTLE
Filed July 18, 1945     3 Sheets-Sheet 1
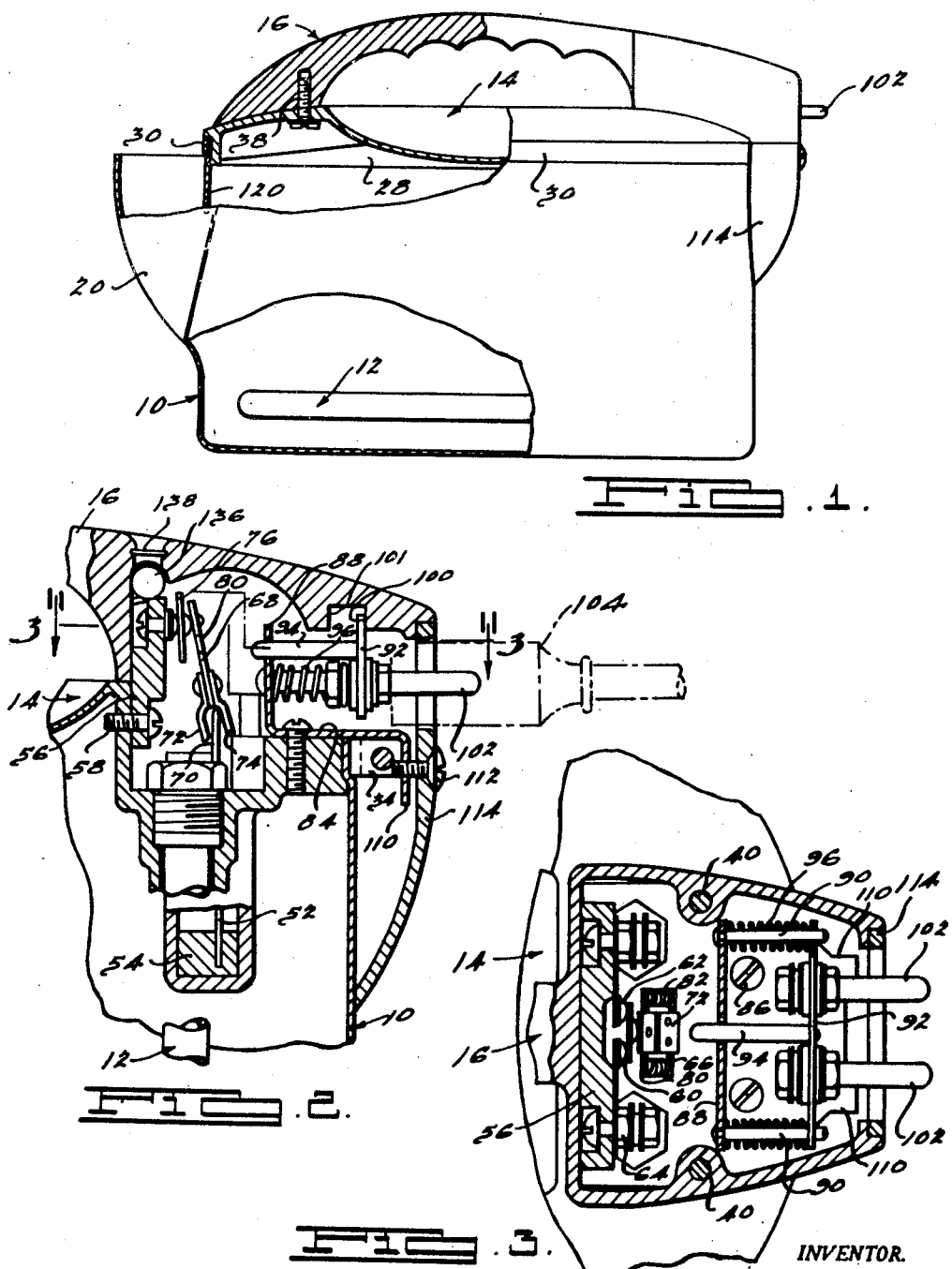
INVENTOR.
Gordon H. Brown.
BY
Edwin J. Balluff
ATTORNEY.

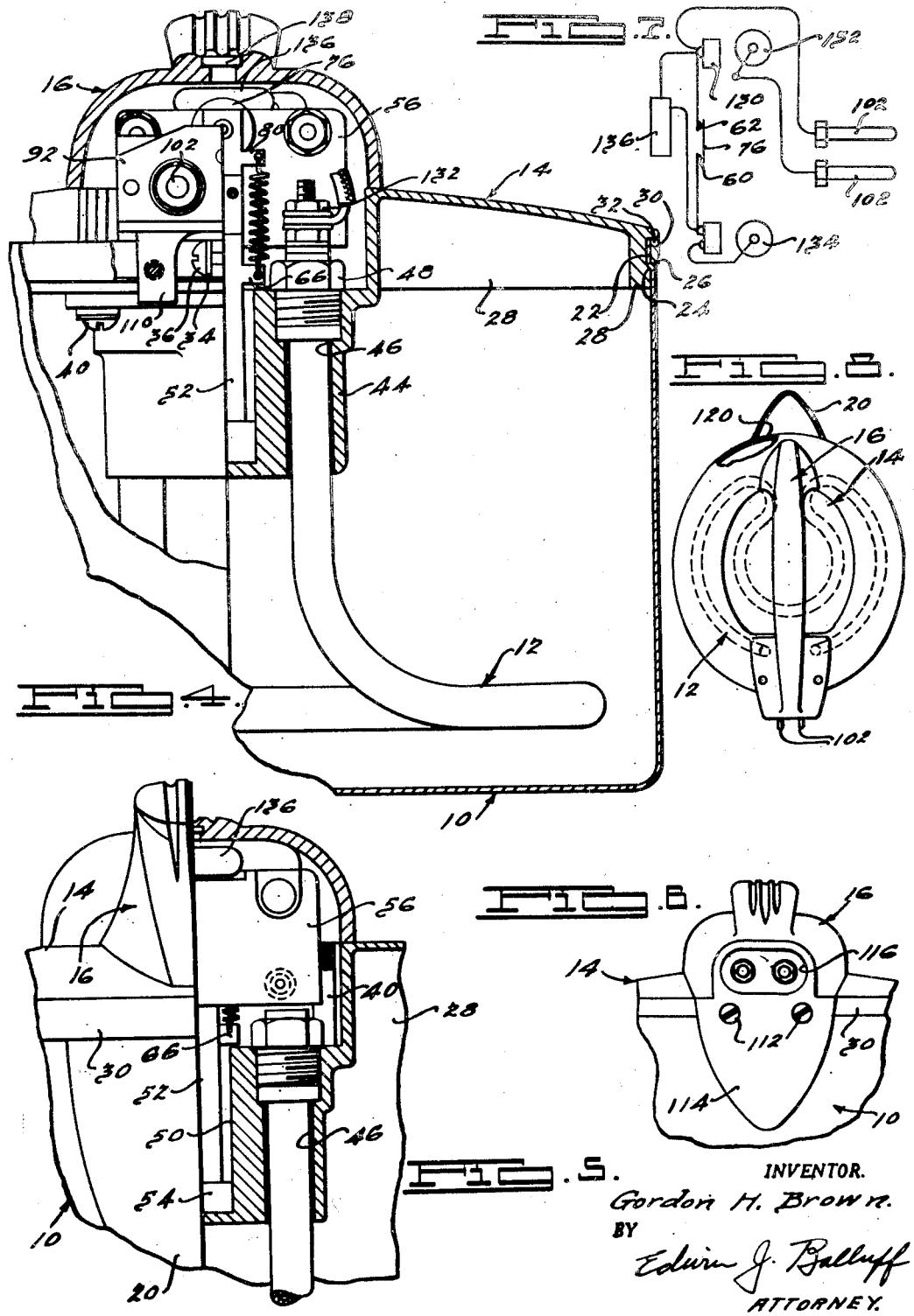

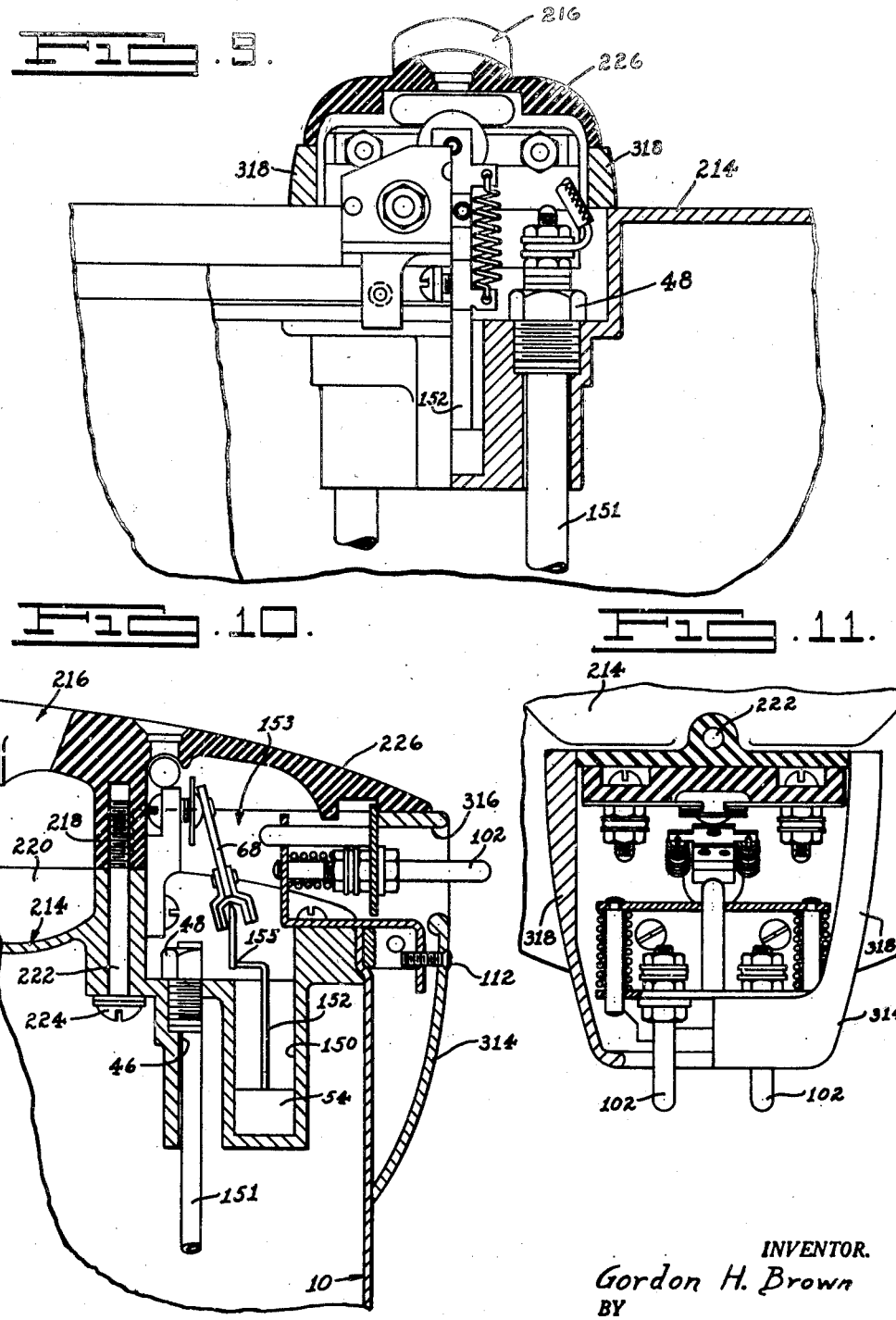

Patented Nov. 29, 1949

2,489,560

UNITED STATES PATENT OFFICE 2,489,560

ELECTRIC TEAKETTLE

Gordon H. Brown, Detroit, Mich.

Application July 18, 1945, Serial No. 605,740

6 Claims. (Cl. 219—44)

This invention relates to electric teakettles.

Principal objects of the invention are to provide:

A new and improved electric teakettle;

An improved construction and assembly for the parts of an electric teakettle;

An electric teakettle in which the shell thereof is unpierced below the water line and in which all of the mechanism is mounted on the cover of the teakettle.

Other and further objects of the invention will be apparent from the following description and claims and will be understood by reference to the accompanying drawings, of which there are three sheets, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings

Fig. 1 is a side elevational view of an electric teakettle embodying the invention, certain of the parts thereof being broken away;

Fig. 2 is an enlarged sectional view of the thermostatic safety switch and resetting mechanism;

Fig. 3 is a horizontal sectional view taken along the staggered line 3—3 of Fig. 2;

Fig. 4 is an enlarged vertical sectional view through the thermostatic safety switch and resetting mechanism but with some of the parts shown in elevation;

Fig. 5 is a fragmentary front elevational view with certain parts of the handle and shell broken away;

Fig. 6 is a fragmentary rear elevational view;

Fig. 7 is a schematic view illustrating the wiring diagram;

Fig. 8 is a plan view on a reduced scale with certain parts thereof broken away;

Fig. 9 is a view similar to Fig. 4 but illustrating a modified form of the invention;

Fig. 10 is a sectional view, similar to Fig. 2, of the modification illustrated in Fig. 9; and Fig. 11 is a horizontal sectional view, similar to Fig. 3, but with some of the parts shown in plan, of the modification illustrated in Fig. 9.

In general an electric teakettle embodying the invention comprises a shell 10 having a heating element 12 therein, a cover 14, a handle 16, and thermostatic safety switch and resetting mechanism which is partially illustrated in Figs. 2 and 3.

The shell 10 may be formed by a stamping of aluminum or other suitable material to provide a vessel which may be of generally oval shape for holding water and a pouring and filling spout 20. The side and bottom walls of the shell 10 need not be and are not pierced or apertured in order to carry out the invention herein disclosed. The rim 22 of the shell 10 is offset slightly inwardly to provide an inner shoulder 24 and an outer shoulder 26 which extend completely around the shell except for that portion thereof forming the spout 20.

The cover 14 may be formed of a die casting of aluminum or other suitable material and is assembled on the shell in such a manner as to close the top of the same except for the opening provided by the spout 20. The cover includes a depending marginal flange 28 having its outer periphery shaped to fit within the rim 22 of the shell and under the inner shoulder 24 thereon. While the outside dimensions of the lower part of the flange 28 are greater than the inside dimensions of the rim 22, the opening of the shell 10 defined by the rim 22 may be enlarged sufficiently to permit the assembly of the cover 14 thereto due to the fact that the rim 22 and the upper walls of the shell 10 at the front are interrupted by the spout 20.

After the cover 14 has been properly assembled on the rim 22 with the flange 28 arranged within the rim 22 and below the shoulder 24, a band 30 of metal or other suitable material is arranged externally on the rim 22 and between the shoulder 26 and the laterally projecting marginal edge 32 of the cover which seats upon the top of the rim 22. At the back of the kettle the ends of the band are turned laterally outward to provide spaced ears 34 having aligned bolt holes therein. The ears 34 are clamped together, so as to clamp the rim 22 securely against the flange 28 of the cover, by a bolt 36, the shank of which extends through the aligned openings in the ears 34 and has a nut (not shown) secured to the threaded end thereof. In this way the cover 14 is detachably secured to the shell 10.

The handle 16, which may be formed of plastic or other suitable material, at its front is secured to the cover by a bolt 38 and at its rear by two bolts 40. As the heads of the bolts 38 and 40 are on the underside of the cover 14, the handle 16 must be assembled to the cover 14 before the same is assembled to the shell 10. In addition, all of the apparatus or mechanism is assembled to the cover 14, and such assembly must take place before the cover 14 is secured to the shell 10. The rear of the handle is enlarged and made hollow so as to cooperate with a suitable depression or recess formed in the cover 14 at the rear thereof to provide an enclosure or housing for the thermostatic safety switch and resetting mechanism.

The cover 14 below the aforementioned recess at the back thereof is formed to provide a depending part 44 upon which the heating element is mounted. Such part 44 includes a pair of sockets 46 in which the ends of the heating element 12 are secured. The heating element may comprise an electric resistance heating element of the type in which an electric resistance is embedded in a refractory insulation encased in a tube or sheath. The heating element 12 is arranged in the form of a loop which is arranged adjacent the bottom of the shell 10. The upper ends of the sockets 46 are threaded to receive nuts 48 which cooperate with packing in the sockets 46 and the ends of the element 12 for securing the same in place. Between the sockets 46 a well 50 is formed in the depending part 44.

The bimetallic element 52 of a thermostatic safety switch has its lower end embedded in a mass of metal 54 disposed in the bottom of well 50. An insulating block or panel 56 is mounted at the front of the recess and on the cover 14 by bolts 58, and this insulating block 56 has mounted thereon spring mounted contacts 60 and 62, each of the contacts being carried by a strip which is bolted by a bolt and nut assembly 64 to the block 56. The upper end of the bimetallic element 52 is in the form of a cross and includes laterally extending arms 66. A lever assembly 68 is mounted on the upper knife edge of the part 70 of the bimetallic element 52 which projects above the arms 66. The lever assembly 68 includes a U-shaped lower end, the legs 72 and 74 of which straddle the part 70 as illustrated in Fig. 2.

A lining (not shown) may be arranged inside the U-shaped lower end of the lever assembly 68 so that the latter is free to rock or slide upon the knife edge which is provided on the top of the upper end 70 of the bimetallic element, and suitable means may be employed to keep the lever assembly 68 in place on the upper edge of element 52.

The upper end of the lever assembly has universally mounted thereon a bridge 76 which bridges the contacts 60 and 62 when the parts are arranged as illustrated in Figs. 2 and 3. In this position the circuit through the heating element 12 is closed.

The bimetallic element 52 and lever 68 comprise a toggle mechanism for automatically opening the switch (comprising the contacts 60, 62 and the bridge 76) when the temperature of the heating element becomes excessively high, which usually happens when the teakettle is operated for too long a time without an adequate amount of water in the shell 10, the heat being conducted through the outer wall of the element 12 to the part 44 and thence through the metal 54 to the bimetallic element 52. During normal operation the bimetallic element 52 and lever 68 are in the position illustrated. However, when the temperature of the heating element 12 becomes too high, as previously described, the upper end 70 of the bimetallic element 52 will move to the left (Fig. 2) sufficiently to throw the upper end of the lever 68 to the right sufficiently to move the bridge 76 so as to open the switch.

The lever 68 includes laterally extending arms 80. Springs 82 connected to the arms 80 of the lever 68 and the arms 66 of the bimetallic element 52 bias the bridge 76 either towards or away from the contacts 60 and 62. As the bimetallic element 52 heats up, the upper end 70 thereof moves gradually to the left (Fig. 2) and as soon as the arms 80 of the lever 68 move to the right past the knife edge on the upper end 70 of the bimetallic element, the springs 82 will snap the lever to the right thereby rapidly opening the switch. For the sake of clarity, the springs 82 are omitted from Fig. 2.

In order to close the switch it is necessary to reset the same, and this is accomplished in the following manner and with the use of the following resetting mechanism. A plate 84 mounted by bolts 86 on the cover 14 is turned up at one end to provide a wall 88 which has rigidly mounted thereon two rearwardly extending pins 90. The pins 90 extend through guide holes in a plate 92. Plate 92 has securely mounted thereon a forwardly extending pin 94 which extends through a hole in the wall 88. The pins 90 are surrounded by springs 96 which bias the plate 92 to the position in which it is illustrated in Figs. 2 and 3. A shoulder 100 formed on the handle limits the rearward movement of the plate 92. Thus the plate 92 is mounted on the wall 88 and for reciprocating movement relative thereto by the pins 90 and 94.

The plate 92 carries prongs forming terminal connectors 102 which are adapted to fit within the terminal sockets carried by a conventional plug 104 on the end of a current conductor. The enclosure formed by the cover 14 and the handle 16 which encloses the thermostatic safety switch and resetting mechanism is open at the back so that such plug may be operatively associated with the terminals 102 which through the thermostatic safety switch are operatively connected with the heating element 12.

The pin 94 is adapted to contact the lever 68, when the thermostatic safety switch is open, for resetting the same. This resetting operation is accomplished when the plug 104 is mounted on the terminals 102 by pushing the plug forwardly or to the left, looking at Figs. 2 and 3. This causes a forward movement of the plate 92 and pin 94 which will engage the lever 68 if the switch is open and push it past the center of the toggle for closing the safety switch, provided that the heating element 12 and bimetallic element 52 have cooled down sufficiently to allow the switch to be closed.

The rear end of the plate 84 has two downwardly extending tabs 110, each of which is provided with a threaded hole with which a screw 112 is cooperable for removably securing in place the terminal shroud 114 which conceals the joint between the handle and the shell 10 at the rear of the kettle. The shroud 114 is shaped to fit the edges of the handle and the back of the shell and has an opening 116 for the plug 104 and through which the terminals 102 project.

As the rim 22 does not extend across the spout 20, a lip 120 may be inserted between the band 30 and the flange 28 of the cover to bridge the spout.

This lip extends downwardly between the spout 20 and the shell 10 for a short distance.

The leads between the various terminals have been omitted for the sake of clarity, but the circuit is indicated in Fig. 7 wherein it appears that one of the terminals 102 is connected to a terminal 130 for the contact 62. The other terminal 102 is connected to a terminal 132 of one end of the heating element 12 while the other terminal 134 of the heating element 12 is connected to the terminal for the switch contact 60.

A signal light comprising a resistance 136 may be connected across the terminals of the switch contacts 60 and 62 and arranged so that when such contacts are open the signal will be illuminated. The signal may be mounted above the panel 56 and be visible through a window 138 arranged in the handle 16 above the light 136.

The modification illustrated in Figs. 9, 10 and 11 differs from that illustrated in Figs. 1 to 8 in two important respects. In the first place, the well 150 in which the bimetallic element 152 of the thermostatic safety switch is arranged is offset from between the ends 151 of the heating element 12, as clearly indicated in Fig. 10. In this figure half of the vertical portion of one end 151 of the heating element has been omitted to clarify the view. The ends 151 of the heating element are secured in the sockets 46 in the same manner as illustrated in Figs. 1–8 by means of the nuts 48 which clamp the ends 151 in the sockets 46 formed integrally with the cover 214 and in such a way as to provide a seal between the water-holding space in the shell 10 and the chamber 153 in which the thermostatic safety switch and resetting mechanism are located.

The thermally responsive element 152 of the thermostatic safety switch has its lower end embedded in a mass of metal 54. Above the well 150 the element 152 is provided with an offset 155 to compensate for the offsetting of the well 150 relative to the ends 151 of the heating element.

The thermostatic safety switch includes the lever assembly 68 and the remainder of the construction as disclosed in the previous embodiment and operates in substantially the same manner. The construction and operation of the resetting mechanism in Figs. 9 to 11 is also the same as that previously disclosed.

The other difference in construction included in Figs. 9 to 11 has reference to the construction and arrangement of the parts which define the chamber 153 for the thermostatic safety switch and resetting mechanism and the manner in which the handle 216 of the kettle is secured to the cover 214 thereof.

In this modification the handle 216 is provided with a portion 218 which is seated directly upon a surface on the cover 214 at the rear of the finger recess 220 therein. The portion 218 of the handle 216 is provided with a threaded hole which receives the threaded end of a screw 222 which extends through a hole in the cover 214 and the head 224 of which screw is arranged below the cover 214 and cooperates therewith for removably clamping the rear end of the handle 216 to the cover 214. The front end of the handle 216 may be secured as illustrated in Fig. 1. The handle 216 includes a horizontally extending portion 226 which projects rearwardly and forms the top wall of the chamber 153. In this case the terminal shroud 314 completely defines the socket 316 for the terminals 102 and in addition includes forwardly extending wall segments 318 which extend forwardly and form the sides of the chamber 153. The wall segments 318 enclose the space and fit between the lower edge of the portion 226 formed integrally with the handle and the cover 214. This terminal shroud 314 is secured to the teakettle assembly by means of the screws 112 so that upon removal of the screws 112 the terminal shroud 314 may be removed, thereby providing access at both sides to the thermostatic safety switch and resetting mechanism.

While I have illustrated and described preferred embodiments of my invention, it is understood that these are capable of modification and I therefore do not wish to be limited to the precise details set forth but desire to avail myself of such changes and alterations as fall within the purview of the following claims.

This application is a continuation in part of my prior copending application Serial No. 539,201, filed June 7, 1944, for "Electric teakettle."

I claim:

1. An electric teakettle comprising a shell member open at the top and forming a vessel for holding liquid, a cover member for the open top of said shell member, an electric heating element having means for mounting the same on the upper side of said cover member and having a portion thereof arranged in the lower part of said vessel and a thermostatic switch carried by said cover member on the upper side thereof, said switch being arranged in the circuit for said heating element and being operable in response to heat generated by the operation of said heating element for opening said circuit, and a handle for said teakettle removably mounted on the upper side of said cover member and provided with a cavity forming at least part of a housing in which said mounting means and thermostatic switch are arranged so that upon removal of said handle from said cover said mounting means and thermostatic switch are accessible.

2. An electric teakettle comprising a shell forming a vessel for holding liquid, a cover removably secured to said shell, an electric heating element carried by said cover and having a portion thereof arranged in the lower part of said shell, said heating element having electric terminals therefor arranged above said cover, means on the upper side of said cover securing said heating element thereto, a thermostatic switch carried by said cover on the upper side thereof, said switch being arranged in the circuit for said heating element and being operable for opening said circuit in response to a rise in temperature of said heating element above a predetermined degree, said cover forming part of a housing for said heating element terminals and securing means and said switch, said circuit having contact terminal prongs for receiving the plug of a current conducting cord mounted on said cover.

3. An electric teakettle comprising a shell forming a vessel for holding liquid, a cover removably secured to said shell, an electric heating element carried by said cover and having a portion thereof arranged in the lower part of said shell and a thermostatic switch carried by said cover on the upper side thereof, said heating element having electric terminals therefor arranged above and mounted on said cover, means on the upper side of said cover securing said heating element thereto, said switch being arranged in the circuit for said heating element and being operable for opening said circuit in response to a rise in temperature of said heating element above a predetermined degree, said circuit having plug contact terminals mounted on said cover, and a handle secured on said cover by means of which said teakettle may be picked up, portions of said cover and handle forming part of a housing for said terminals, said securing means and said switch, and means for securing said cover to said shell.

4. An electric teakettle comprising an unpierced shell open at the top and forming a vessel for holding liquid, a cover for the open top of said shell, means removably securing said cover to said shell, an electric heating element carried by said cover and having a portion thereof arranged in the lower part of said shell, a thermostatic switch carried by said cover, said switch being operatively arranged in the circuit for said heating element, contact terminals for the circuit of the heating element mounted on said cover, a handle on said cover by means of which said teakettle may be picked up, and a shroud for said terminals, said shroud and handle cooperating with said cover to form a housing which encloses said thermostatic switch, said contact terminals and the ends of said heating element.

5. An electric teakettle comprising a shell open at the top and forming a vessel for holding liquid, a cover closing the open top of said shell, an electric heating element having means associated therewith mounting the same on said cover and having a portion thereof arranged in the lower part of said vessel, a thermostatic switch carried by said cover, said switch being arranged in the circuit for said heating element and being operable in response to heat generated by the operation of said heating element for opening said circuit, and a handle for said teakettle mounted on said cover, parts of said handle and cover forming at least part of a housing in which said mounting and thermostatic switch are arranged.

6. An electric teakettle comprising a shell open at the top and forming a vessel for holding liquid, a cover closing the open top of said shell, an electric heating element having means associated therewith mounting the same on said cover and having a portion thereof arranged in the lower part of said vessel, a thermostatic switch carried by said cover, said switch being arranged in the circuit for said heating element and being operable in response to heat generated by the operation of said heating element for opening said circuit, a handle for said teakettle mounted on said cover, parts of said handle and cover forming at least part of a housing in which said mounting and thermostatic switch are arranged, contact terminals for the circuit of said heating element mounted on said cover, and a shroud for said terminals secured to said shell, said shroud having integral wall segments projecting forwardly at the sides of said thermostatic switch and forming side walls of said housing.

GORDON H. BROWN.

REFERENCES CITED

The following references are of record in the file of this patent:

UNITED STATES PATENTS

| Number | Name | Date |
|---|---|---|
| 1,599,912 | Naujoks | Sept. 14, 1926 |
| 2,027,537 | Kircher | Jan. 14, 1936 |
| 2,194,820 | Connell et al. | Mar. 26, 1940 |
| 2,286,470 | Dafforn et al. | June 16, 1942 |